United States Patent [19]

Ernster

[11] Patent Number: 4,600,588
[45] Date of Patent: Jul. 15, 1986

[54] MILK PROTEIN HYDROLYSATE AND PROCESS OF PREPARATION

[76] Inventor: John H. Ernster, 5658 Ravenspur, Palos Verdes, Calif. 90274

[21] Appl. No.: 687,203

[22] Filed: Dec. 28, 1984

Related U.S. Application Data

[63] Continuation-in-part of Ser. No. 424,754, Sep. 24, 1982, abandoned, which is a continuation-in-part of Ser. No. 350,319, Feb. 19, 1982, Pat. No. 4,363,820, which is a continuation-in-part of Ser. No. 179,771, Aug. 20, 1980, abandoned.

[51] Int. Cl.$^4$ ................................................ A23C 9/12
[52] U.S. Cl. ..................................... 426/42; 426/580; 426/657
[58] Field of Search ................... 426/34, 42, 580, 657, 426/56, 590, 599; 260/119, 120; 435/272

[56] References Cited

U.S. PATENT DOCUMENTS

| | | | |
|---|---|---|---|
| 2,493,777 | 1/1950 | Reyniers | 426/657 X |
| 2,547,136 | 4/1951 | Oberg et al. | 426/42 |
| 3,036,918 | 5/1962 | Wingerd et al. | 426/42 |
| 4,055,555 | 10/1977 | Badertscher et al. | 426/657 X |
| 4,259,357 | 3/1981 | Kranenburg | 426/56 X |

Primary Examiner—Arthur L. Corbin
Attorney, Agent, or Firm—Herb Boswell

[57] ABSTRACT

A milk protein hydrolysate is prepared from acid precipitated casein by treating the casein with either a Milezyme AFP enzyme or Neutrase enzyme in the presence of an alkali such as sodium or potassium hydroxide. The resulting milk protein hydrolysate exhibits flavor and emulsifying characteristics differing from the enzymatically treated casein.

19 Claims, No Drawings

MILK PROTEIN HYDROLYSATE AND PROCESS OF PREPARATION

CROSS REFERENCE TO RELATED APPLICATIONS

This application is a continuation in part of my application Ser. No. 424,754 filed Sept. 24, 1982 and entitled, "Modified Casein Exhibiting Milk Like Flavor", now abandoned which in turn is a continuation in part of my application Ser. No. 350,319 filed Feb. 19, 1982 entitled, "Process for Preparing Canned Tuna Flesh", now U.S. Pat. No. 4,363,820 which in turn was a continuation in part of my application Ser. No. 179,771 filed Aug. 20, 1980 entitled, "Composition and Process Used in Preparing Canned Tuna", now abandoned. Furthermore, this application is related to my application Ser. No. 644,022 filed Aug. 23, 1984 and entitled, "Hydrolyzed Protein Composition and Process Used in Preparing Thereof", now U.S. Pat. No. 4,545,933 which is a continuation in part of my application Ser. No. 404,049, filed Aug. 2, 1982, now abandoned which was filed as a divisional of the above referred to application Ser. No. 350,319. The contents of all of these applications, Ser. Nos. 424,754; 350,319; 179,771; 644,022; 404,049 and U.S. Pat. No. 4,363,820 are all herein expressly incorporated by reference.

BACKGROUND OF INVENTION

This invention is directed to a milk protein hydrolysate composition, and processes for preparing the same which utilize a specific enzymatic treatment of casein in the presence of alkali. More specifically the invention is directed to the use of specific fungal protease enzymes for treating casein at alkaline pHs.

In my U.S. Pat. No. 4,363,820, the entire contents which are herein incorporated by reference, I disclose a composition based on casein and a process for preparing that composition. That composition is extremely useful in preparing canned tuna and other seafood flesh products. The composition is prepared by treating casein with a very basic solution of sodium or potassium hydroxide to partially hydrolyze it.

The composition of U.S. Pat. No. 4,363,820, is directed to uses as an additive to solid food products of animal origin. It is not primarily directed toward utilization in beverages. For utilization in beverages, animal-derived protein products and/or compositions must have certain essential flavor characteristics.

Milk is a well known and widely utilized foodstuff. Bovine milk constitutes a major industry in many countries of the world. The milk obtained from the cow contains proteins, carbohydrates, and lipids as well as vitamins, minerals, and the like. The protein content of milk is an extremely useful entity by itself when freed from other milk components such as the carbohydrates and lipids. Casein, the major milk protein, is normally separated from the whey by precipitating the casein at a pH below its isoelectric point. Normally, in situ bacterial lactic acid precipitation is utilized.

The acid precipitated casein is composed of several related fractions. These combined fractions are very cationic in nature and somewhat hydroscopic. Unless subjected to extreme drying conditions, the casein so obtained will retain a small fraction of water of about 9 and 10%.

Casein has been isolated and utilized for many years. It was recognized several decades ago that casein could be utilized as an additive to other foodstuffs in addition to its use as a primary foodstuff. Because casein is primarily composed of proteins, the useful properties of these proteins have been sought when utilizing casein as an additive.

U.S. Pat. No. 2,547,136 patented in 1951, describes utilizing an enzymatically treated casein as a food additive for imparting useful whipping properties similar to those obtained from eggwhites. This patent describes treating casein with a variety of proteolytic enzymes including trypsin, erepsin, pepsin, papain, and ficin. The patent notes that trypsin was found to be the most satisfactory for the purposes of the invention. As described in this patent, the casein is treated with trypsin at an elevated temperature of 50° C. After the enzymatic treatment, the reaction solution was acidified and filtered to remove undesirable products. After concentration by evaporation, and again filtering the solution, the product was isolated by raising the pH to about pH 7.5 and spray drying.

Approximately one decade after issuance of U.S. Pat. No. 2,547,136, U.S. Pat. No. 3,036,918 was issued. This patent noted that previously known caseins were undesirable because of the development upon storage or shelving of certain undesirable flavor characteristics. In order to overcome the deficiences of the prior known treated caseins, U.S. Pat. No. 3,036,918 taught the inclusion of an oxidation process after enzymatic treatment. The inventors of U.S. Pat. No. 3,036,918 also noted that extensive protein hydrolysis of casein also resulted in off flavor characteristics associated with the products thereof. In view of this, in addition to the oxidation step, U.S. Pat. No. 3,036,918 also teaches titration of the amino acid tyrosine in order to prevent over excessive protein hydrolysis.

U.S. Pat. No. 3,036,918 teaches that the ascorbic acid fraction of casein, which prior to the issuance of this patent had been accepted as a preservative for such products, in fact, led to undesirable flavor characteristics. In order to circumvent these undesirable flavor characteristics, U.S. Pat. No. 3,036,918 teaches the above referred to oxidation of ascorbic acid after the enzymatic treatment of the casein.

Further, U.S. Pat. No. 3,036,918 teaches the equivalency of certain enzymes for enzymatic treatment of casein. Noted as useful, in U.S. Pat. No. 3,036,918, as proteolytic enzymes for treating casein are pancreatin, which is a tryspin, bromelin, a protease from pineapple Rhozyme W-15 a commercial bacterial protease, and any proteolytic fungal enzyme. Further, it also includes pepsin when utilized at low pHs, and for products wherein the flavor development would not be unobjectionable. Presumably the panacea of any objectionable flavor characteristics derived from casein treated with the above referred to enzymes, would be the oxidation which follows the enzymatic treatment.

Products such as meat products and the like, have their own natural prevailing flavors which are sufficient to override and mask certain undesirable flavor characteristics of additives which might be introduced into these products. Contrary to this, beverages such as high-protein beverages and the like, do not have these natural overpowering or prevailing flavor and odor characteristics. Because of this, components which are added to high-protein drinks and the like cannot have any overriding or prevailing undesirable flavor characteristics. Heretofore, while certain casein derived proteins might have been useful for food products where there are prevailing or overriding flavor characteristics derived from the basic food product, or the casein derived proteins are utilized in such a small concentration that any undesirable flavorings are lost, casein derived proteins have not been useful in other food products such as beverages or the like which are more bland, need to be more milk-like, and do not have any "masking" agents. This is especially true in Health Food Beverages wherein artificial flavoring additives added to mask undesirable flavors would not be acceptable by the consumer.

BRIEF DESCRIPTION OF THE INVENTION

In view of the above, it is, therefore, a broad object of this invention to provide for a composition and process for making the same which comprises a casein derived milk protein hydrolysate. It is a further object of this invention to provide for processes for preparing such a casein derived milk protein hydrolysate.

These and other objects, as will be evident from the remainder of this specification, are achieved in a milk protein hydrolysate consisting of a quantity of an acid precipitated casein; a quantity of an enzyme chosen from the group consisting of Milezyme AFP enzymes and Neutrase from about 0.001% to about 1% by weight of said enzyme per weight of the anhydrous form of said casein; a quantity of an alkali compound; and a quantity of water.

Further, these objects are achieved in a process of preparing a milk protein hydrolysate for use as a food additive which comprises treating casein in the presence of water with an enzyme chosen from the group consisting of Milezyme AFP enzymes and Neutrase for a time period less than one half hour at a pH greater than pH 5.2; treating the product of said casein and said enzyme with a compound chosen from the group consisting of sodium hydroxide and potassium hydroxide so as to increase the pH to at least pH 10; and isolating the modified protein by removing said water to form a solid.

Additionally, these objects are achieved in a process for preparing a milk protein hydrolysate for use as a food additive which comprises treating casein in the presence of water with an alkali compound wherein said alkali compound is present in an amount sufficient to give a pH of at least pH 7; adding a quantity of an enzyme chosen from the group consisting of Milezyme AFP enzymes and Neutrase of an amount from about 0.001% to about 1% by weight of said enzyme per weight of the anhydrous form of said casein; heating said casein and said enzyme to a temperature sufficient to effect a heat kill of said enzymes; isolating said milk protein hydrolysate by removing said water to form a solid.

Suitable as the alkali compound are sodium hydroxide and potassium hydroxide.

I have found that contrary to the very astringent taste which is produced by following the teachings of prior United States patents, that utilizing Milezyme AFP enzymes and Neutrase enzyme that no astringent taste is imparted to the milk protein hydrolysate and that a milk protein hydrolysate can easily and simply be produced utilizing a minimum of steps.

In addition to the pleasant palatable taste achieved in beverages utilizing the milk protein hydrolysate of my invention, the milk protein hydrolysate can be used in other food products for other characteristics other than simply its flavor or odor characteristics. It has been found to be an extremely useful protein additive for emulsification characteristics in certain meat products. Contrary to other milk protein hydrolysates, it exhibits exceptional water and fat binding ability so as to lend exceptional structural integrity to processed meat products which employ emulsions in their structure.

DETAILED DESCRIPTION OF THE INVENTION

Casein is the principal protein of bovine milk. By acidification to pH 4.7, casein can be isoelectrically precipitated out of solution. This is sometimes done in situ utilizing bacterial lactic acid. The caseins derived from precipitation are a mixture of several related proteins designated as alpha, beta, delta and kappa casein. The majority of the weight of the precipitated casein is in the alpha, beta, and kappa fractions.

Acid precipitated caseins are very cationic in nature. Additionally, unless severely dry, they retain a small portion of water of about 9 to 10%. Insofar as the processes of this invention are aqueous processes, the water retained by the acid precipitated casein is not detrimental to the reactions and, in fact, contribute to the solvent of the reaction. As such there is no need for drying of the casein prior to utilization of the same.

In U.S. Pat. No. 4,363,820, I describe a preparation of a hydrolyzed casein utilizing certain alkali treatment, preferably sodium or potassium hydroxide. That treatment involves treating the acid precipitated casein with strong alkali solutions to yield a hydrolyzed casein product which shows a partial anionic character when subjected to electrophoresis at high pH as well as changes in the amount of protein nitrogen compared to non-alkali hydrolyzed casein.

Both the product described in U.S. Pat. No. 4,363,820, and the product of this invention, differ significantly from alkali caseinates. Alkali caseinates are salts of casein. Since casein is a protein made up of amino acids, alkali salts, generally the sodium salt, are easily prepared. Insofar as alkali caseinates are, in fact, only salts of casein itself, they differ extensively in the properties from both my hydrolyzed casein of U.S. Pat. No. 4,363,820, and the product of this invention.

The product of this invention also differs from the product of U.S. Pat. No. 4,363,820, as well as from other enzymatically treated caseins. Subjectively, the milk protein hydrolysate of this invention has certain taste and odor properties which distinquish it from other known enzymatically treated casein products, sodium casinate, or other hydrolyzed casein products such as taught in U.S. Pat. No. 4,363,820. The milk protein hydrolysate of this invention has a very milk-like taste. The product, when tasted as a dry powder, is very bland, not at all overpowering, and leaves no aftertaste. When mixed with other products and/or components of certain foodstuffs and beverages, its flavor and odor charactertistics blend into those of the other products and/or foodstuffs in the same manner as does milk itself. This, therefore, renders the products and/or foodstuffs more palatable and more acceptable to the consumer than other casein based enzyme treated products or hydrolyzed casein products.

Other casein based enzymatic derived products and-/or hydrolyzed casein products are very astringent in taste having very discernable tastes and odors associated with them. Certain of these leave very discernable and disagreeable aftertastes which can best be described as that left in the mouth by foodstuffs bearing too much meat tenderizer thereon.

Aside from its flavor and odor characteristics, the milk protein hydrolysate of this invention is very useful as an emulsifying agent in certain processed meat products such as frankfurters and the like. The milk protein hydrolysate of the invention exhibits outstanding emulsifying characteristics for maintaining as an intrical mass the fat, protein and water content of these processed meat products.

In preparing such meat products, the normal integrity of the meat flesh or other animal product is lost when the animal parts are rendered by chopping, grinding, or the like. By including a small portion of the milk protein hydrolysate of this invention with the animal meat product and a small amount of water, a stabilized emulsion is achieved of the animal protein, fat, and water which has sufficient adhesive properties so as to maintain the integrity of the product, i.e. the frankfurter or the like, yet is also easily eaten. This is achieved with my milk protein hydrolysate without the introduction of any background or aftertaste into the product.

Because casein is isoelectrically precipitated out of solution at pH 4.7, and because of the necessity of utilizing solution reaction media for enzymatic treatment, as a practical matter processes for preparing my milk protein hydrolysate would be conducted at pHs greater than 4.7. However, at a pH below that of about pH 5.2, casein is only very limitedly soluble. Therefore, casein would normally be treated with the emzymes as outlined below at a pH of at least pH 5.2. As is shown in one of the illustrative examples, enzymatic treatment at a pH greater that the pH 6 insures solubility of the casein.

Enzymatic activities are dependent upon several variables, one of them being temperature. As outlined in greater detail in the examples which follow, enzymatic treatment can be conducted at from about room temperature to certain elevated temperatures which are below that which would cause denaturization of the enzyme and, thus, total loss of activity of the same.

Casein is a readily available material produced in quantity from excess milk. The enzymes, as noted below, which are utilized for production of my milk protein hydrolysate, however, are more economically precious than the casein. In view of this, as a practical matter, while high enzyme concentrations may lead to increased enzyme activity, for economic considerations of commercial processes, the enzymes will be utilized in an amount sufficient so as to achieve the desirable degree of hydrolysis in an economically viable time period. Normally, the enzymes will be used at a concentration level of about 0.001% to about 1% by weight of the enzyme per weight of the anhydrous form of the casein.

I have found that when acid precipitated casein is treated with one of two groups of enzymes, both of which are primarily commercialized as enzymatic cleaners or laundry additives, that the milk protein hydrolysate achieved from these enzymatic reactions exhibit certain properties as outlined above which differentiate it from other products from other enzymatic treatments of casein. The two groups of enzymes useful for the preparation of my milk protein hydrolysate are group 1, the family of enzymes known as Milezyme AFP enzymes available from Miles Laboratory, Elkhart, Ind.; and group 2, Neutrase available from Novalabs which is a division of Nova, a Danish Company having U.S. offices in Connecticut. The family of Milzymes AFP enzymes are individually designated based upon molecular weight. Included in this family would be Milzymes AFP 1000, 2000, 3000, and fungal protease 31,000.

Milezyme AFP enzymes are acid fungal proteases derived from controlled fermentation of *Aspergillus niger* var. They are commercially available from Miles Laboratories, Enzyme Products Division, Elkhart, Ind. 46515. In dried powder form, these enzymes are light tan to white in color, free of offensive odors, and free of offensive taste. They are noted by the supplier as having an optimum pH range of pH 2.5 to 3.5, an effective pH range of pH 2.5 to pH 6.0, and pH stability in the range of pH 3.0 to pH 5.0. They demonstrate good solution stability over the range of pH 3.0 to pH 5.0. The milezymes AFP 1000, 2000, 3000, and fungal protease 31,000, differ from one another with respect to their activity as measured spectrophotometrically utilizing spectrophotometric acid protease units (sapa). The milezymes AFP 1000 has an activity of 1000 spau/g; the 2000 an activity of 2000 spau/g; the 3000 an activity of 3000 spau/g; and the 31,000 an activity of 31,000 spau/g.

Neutrase is prepared from purified cultured liquid obtained from *Bacillus subtilis*. It is commercially available from Novo Laboratories, Inc., Wilton, Conn. 06897. It is available as a light brown granular product or a clear brown liquid having minimum proteolytic activity (utilizing anson units per gram, AU/gm) of 0.5. The pH of the liquid is between pH 5.0 and pH 6.0; heavy metals are present in 40 parts per million or less; lead in 10 parts per million or less; arsenic in 3 parts per million or less; with a total amount of viable organisms per gram equal to 5 times $10^4$ maximum.

The commericial supplier of the Milezyme AFP 2000 enzyme proports that protease activity of this enzyme is inactivated in pH ranges above pH 7. The activity is also noted as being temperature dependent. According to the product specifications of this enzyme, optimum activity is in the range of pH 2.5 to 3.5. The commercial supplier also proports that activity at pH 6.5 at a 60° C. drops to only 3% of that seen at pH 3.5 at 30° C.

Contrary to the Commercial Suppliers' technical data supplied with the Milezyme AFP 2000 enzyme, I have found that above pH 7 treatment of acid precipitated casein with this enzyme yields my milk protein hydrolysate having the desired properties outlined above. As will be outlined in more detail in the examples below, even at extremely high pHs, i.e. a pH above pH 10, I have achieved enzymatic modification of the acid precipitated casein so as to yield my milk protein hydrolysate. While I do not wish to be bound by theory, it is my belief that the Milezyme AFP enzymes exhibit several types of enzymatic activity. They appear to react on one set of amino acids at a low pH and a further set at a higher pH. The activity at the higher pH is not described in the technical literature available with regard to the Milezymes AFP enzymes.

I have found that the enzymatic treatment of the acid precipitated casein can be done from about room temperature to elevated temperatures below that which thermally degrades the enzyme. In a first process, enzymatic treatment is carried out in the presence of an alkali compound at alkaline pHs. Suitable for use as the alkali compound are sodium and potassium hydroxide with potassium hydroxide being the preferred compound. In this process, no external heat is applied to the enzymatic reaction mixture until the pH of the reaction mixture starts to drop. When an optimum pH for the final product is achieved, heat is applied. Heating is continued until a temperature is reached which is sufficient to totally inactivate the enzyme, as for example about 160° F., but preferably higher than that up to and including boiling point with an optimum temperature being around 190° F. After heat treatment, the hot solution is then dried to yield my milk protein hydrolysate.

In a further process, the acid precipitated casein is first treated with the enzyme at a pH greater than that noted above for isoelectric precipitation of the casein out of solution but preferably greater than pH 6. After initial enzymatic treatment, the pH of the reaction mixture is then adjusted to high alkaline pHs as for instance greater than pH 10. After a short reaction time at this pH, the solution is then heat treated followed by evaporation for isolating the product.

Normally, the enzyme will be used in an amount of about 0.001% to about 1% based on the weight of the enzyme per the anhydrous weight of the acid precipitated casein. Normally, the alkali utilized, preferably sodium or potassium hydroxide, would be an amount sufficient to give a pH of from pH 8 to pH 9 for the first process of the invention and a pH of at least pH 10 or above, as for example pH 10.5 or above, for the additional process of the invention.

The sodium or potassium hydroxide is preferably added as a concentrated solution, however, it could be added in other forms, such as a dry solid, to the appropriate reaction mixture. While diluted solutions of sodium or potassium hydroxide could be utilized, since the final step of the reaction requires drying of the reaction mixture to yield the product, it is deemed unneccessary to add excess water by utilization of diluted solutions. Insofar as evaporation of water is an energy intensive step and insofar as addition of the sodium or potassium hydroxide can be effected utilizing concentrated solutions as per the examples below, concentrated solutions are presently preferred.

An amount of water sufficient to solubilize the casein at the particular pH for either of the two processes described would be utilized. Again, since any water added must ultimately be removed, and this is an energy intensive step, over dilution of the reaction solutions is economically impractical even though both enzymatically or chemically, dilute solutions can be used.

To achieve the particular properties noted for my milk protein hydrolysate, enzymatic treatment should be for a time period less than 30 minutes. In the high alkali process (i.e. pH greater than pH 10), treatment is preferably for less than 15 minutes. In the milder alkali process (i.e. treatment at pH of at least pH 7), time of treatment is normally dictated by the fall of the pH, which normally occurs under 15 minutes.

EXAMPLE 1

In a first mild alkali process for preparing the milk protein hydrolysate of the invention, four hundred (400) pounds of acid precipitated casein was added to two thousand (2000) pounds of water in a high sheer mixer. The casein and water were stirred in order to form a slurry. The slurry was then pumped to a further reaction vessel which is capable of strong agitation, both centrally and peripherally. To the slurry was added 70 grams of Milezyme AFP 3,000. After five minutes of stirring, 5 pounds of potassium hydroxide as a 50% solution was added. This raised the pH to a range of pH 8.5 to 9. The pH of the reaction solution was monitored and after approximately 10 to 15 minutes, the pH has dropped to 7. At pH 7, the reaction vessel was then steam heated until a reaction temperature of 190° was reached. Upon initiation of heat treatment, the pH stabilized at approximately pH 6.7 to 6.8 and remained there for the remainder of the heat treatment. When a reaction temperature of 190° was reached, the product was transferred to a roller dryer and dryed to yield 364 pounds of my milk protein hydrolysate.

In the above process, after mixing of the enzyme with the acid precipitated casein, the alkali hydroxide was then added to the reaction vessel to raise the pH to a range of 8.5 to 9. This was done by the addition of sufficient alkali to reach this level. The reaction was then allowed to proceed at room temperature. As the reaction proceeded, the pH slowly dropped, indicating a chemical change within the reaction media as well as the enzymatic reaction. When the reaction had reached a final desired level of a pH of about 6.7 to about 7, the reaction media is then heated. Upon initiation of the heat treatment, I have found that during this process the pH then stabilizes at the pH wherein heat treatment is initiated. The stability of the pH is maintained during the subsequent heat treatment up to the appropriate temperature, preferably 190°.

In a further high alkali process in preparing my milk protein hydrolysate, the following reaction was carried out.

EXAMPLE 2

1400 grams of casein containing 9-10% water was taken up in 8600 mls. of water by the addition of potassium hydroxide to a pH of approximately 6 to 6.2. Three (3) grams of Milezyme AFP 1000 was added and the resulting solution was held at 110° F. with agitation for 30 minutes. Upon expiration of the 30 minute time period, the pH was adjusted to 10.5 by the addition of a 50% solution of potassium hydroxide. The reaction was heated at 180° F. for 15 minutes. Upon completion of the reaction period, excess moisture was evaporated to yield a solid which was dried for subsequent storage and use.

In this example, the acid precipitated casein was treated with the Milezyme AFP enzyme at a pH slightly below neutral and at an elevated temperature. After the appropriate expiration of treatment time, the pH was then adjusted upwardly to pH 10.5 by the addition of strong alkali. The reaction mixture was then further elevated in temperature to a temperature which insured complete kill of the enzyme. The heat kill of the enzyme was done even in view of the strong alkali environment which the manufacturer states inactivates the enzyme. Finally, moisture was evaporated to yield the product.

Products of both the process and the additional process are both differentiated from the astringent wet cardboard-like taste of both sodium caseinate and calcium caseinate. Further, they are differentiated from other enzyme treated caseinate products. If, for instance, bromylin or trypsin are utilized in processes similar to those described above, the product does not have the mild milk like flavor as per my milk protein hydrolysate. Rather, it exhibits a strong astringent taste which would be unsuitable for use on a high protein beverage and the like.

Additionally, my milk protein hydrolysate, while having a very milk like taste, is differentiated from milk in itself. The protein content of Bovine milk is in the range of 4.5 to 5%, however, Bovine milk also includes an almost equal concentration of lipids and sugars along with the protein. Products derived from my milk protein hydrolysate, such as high protein beverages, would have little or not lipid or carbohydrate content while still providing an elevated protein content. It is evident that this is extremely advantageous in certain situations with certain individuals wherein it is deemed advantageous to limit both the carbohydrate and lipid intakes while still providing a high protein dietary supplement.

For preparation of high protein beverages and the like, my milk protein hydrolysate would be mixed with a suitable carrier liquid with or without additional products and/or additives. Additives might include vitamins, minerals, and the like, or individual amino acids wherein it is desirable to increase not only the general protein intake of the individual but also a specific amino acid intake.

For the preparation of emulsified meat products, as for instance in all beef franks, all pork franks, and the like, a quantity no greater than 1% of my milk protein hydrolysate would be mixed with approximately 95% of rendered meat products and up to approximately 4% of water. As noted above, my milk protein hydrolysate serves as an excellent emulsifying agent for the fats and liquids of these meat products. After mixing of my milk protein hydrolysate with the rendered meat product and the additive water, the product would then be processed in the normal manner well known to those skilled in the production of such meat products, as for instance frankfurters and the like.

While one of the domineering features of my milk protein hydrolysate is its taste (actually the lack thereof), it has also been compared on a more quantitative basis to other similar products. Utilizing certain model systems, my milk protein hydrolysate was compared with a sample of high viscosity sodium caseinate obtained from EmHV, DMV Corporation, the Netherlands, two commercially available milk protein hydrolysates and the hydrolyzed casein product of U.S. Pat. No. 4,363,820.

Typically, my milk protein hydrolysate has a protein content of approximately 87%, a fat content of approximately 4.5%, and a moisture content of approximately 2%. The other two commerical milk protein hydrolysates with which it was compared, exhibited a protein content of approximately 90%, fat content of 4%, and moisture content of 2.5% for the first product; and a protein content of approximately 83%, fat content of approximately 1%, and moisture content of approximately 3.5% for the second product. This compares with a protein content of approximately 80%, a fat content of approximately 1.5%, and a moisture content of approximately 10.3% for the product of U.S. Pat. No. 4,363,820; and a protein content of approximately 86%, a fat content of approximately 2%, and a moisture content of approximately 4% for the commercial sample of calcium caseinate.

In order to evaluate the above referred to casein-derived products, a simulated processed food or pre-emulsion was prepared. This consisted of heating and chopping 1.82 kilograms samples of pork back fat in a steam-fed laboratory chopping bowl to a liquified 27° C. form. To each of the identical samples, 0.36 kilograms of the respective proteins were added to the chopper followed by 1.82 kilograms of 60° water. The mixtures were then chopped for an additional 10 minutes at 110° F. at which time the pre-emulsions prepared were poured into tubes and cooled for 24 hours at 5° C.

Townsend and Rongey emulsion stability measurements were made on the above samples and textural comparisons were made utilizing the Instrom universal testing machine. The Townsend and Rongey test favored my milk protein hydrolysate over all of the other of the test proteins. Based on this, it was concluded by the tester that my milk protein hydrolysate should have the ability to supply a greater water and fat binding ability than the other samples, as well as structural integrity in a finished meat product.

The Ingstrom test was done to compare the firmness of the pre-emulsions. In this test, my milk protein hydrolysate behaved very similar to a sodium caseinate emulsion and was superior over the other test samples.

I claim:
1. A milk protein hydrolysate consisting of:
   a quantity of an acid precipitated casein;
   a quantity of an enzyme chosen from the group consisting of (1) an acid fungal protease derived from controlled fermentation of *Aspergillus niger* var and (2) a protease prepared from purified cultured liquid obtained from *Bacillus subtilis;* said protease derived from *Aspergillus niger* var being light tan to white in color, free of offensive odors, free from offensive taste, and having an optimum pH range of pH 2.5 to pH 3.5, an effective pH range of 2.5 to pH 6.0 and pH stability in the range of pH 3.0 to pH 5.0; said protease obtained from said *Bacillus subtilis* being a clear brown liquid having a pH of pH 5.0 to pH 6.0 and having a minimum proteolytic activity of 0.5 AU/gm; said enzyme being present in an amount from about 0.001% to about 1% by weight per weight of the anhydrous form of said casein;
   a quantity of an alkali compound; and
   a quantity of water.
2. The hydrolysate of claim 1 wherein:
   said alkali compound is chosen from the group consisting of sodium hydroxide and potassium hydroxide.
3. The hydrolysate of claim 2 wherein:
   said alkali compound is potassium hydroxide.
4. The hydrolysate of claim 2 wherein:
   said alkali compound is present in an amount sufficient to give a pH of at least pH 10.
5. The hydrolysate of claim 1 wherein:
   said alkali compound is present in an amount sufficient to give a pH of at least pH 7.
6. The hydrolysate of claim 1 wherein:
   said alkali compound is present in an amount sufficient to give a pH of at least pH 10.
7. The hydrolysate of claim 1 wherein:
   said enzyme is said protease enzyme derived from *Aspergillus niger* var.
8. A process of preparing a milk protein hydrolysate for use as a food additive which comprises:
   treating acid precipitated casein in the presence of water with an enzyme chosen from the group consisting of (1) an acid fungal protease derived from controlled fermentation of *Aspergillus niger* var and (2) a protease prepared from purified cultured liquid obtained from *Bacillus subtilis;* said protease derived from *Aspergillus niger* var being light tan to white in color, free of offensive odors, free from offensive taste, and having an optimum pH range of pH 2.5 to pH 3.5, an effective pH range of 2.5 to pH 6.0 and pH stability in the range of pH 3.0 to pH 5.0; said protease obtained from said *Bacillus sub-*

*tilis* being a clear brown liquid having a pH of pH 5.0 to pH 6.0 and having a minimum proteolytic activity of 0.5 AU/gm; said acid precipitated casein being treated with said enzyme for a time period less than one half hour at a pH greater than pH 5.2, said enzyme being used in an amount from about 0.001% to about 1% by weight per weight of the anhydrous form of said casein;

treating the product of said casein and said enzyme with a compound chosen from the group consisting of sodium hydroxide and potassium hydroxide so as to increase the pH to at least pH 10; and then isolating the treated casein by removing said water to form a solid milk protein hydrolysate.

9. The process of claim 8 wherein:
said casein is treated with said enzyme at a pH greater than pH 6.

10. The process of claim 8 wherein:
said compound is potassium hydroxide.

11. The process of claim 8 wherein:
said casein is treated with said enzyme for a time period less than fifteen (15) minutes.

12. A process for preparing a milk protein hydrolysate for use as a food additive which comprises:
treating acid precipitated casein in the presence of water with an alkali compound wherein said alkali compound is present in an amount sufficient to give a pH of at least pH 7;

adding a quantity of an enzyme chosen from the group consisting of (1) an acid fungal protease derived from controlled fermentation of *Aspergillus niger* var and (2) a protease prepared from purified cultured liquid obtained from *Bacillus subtilis;* said protease derived from *Aspergillus niger* var being light tan to white in color, free of offensive odors, free from offensive taste, and having an optimum pH range of pH 2.5 to pH 3.5, an effective pH range of 2.5 to pH 6.0 and pH stability in the range of pH 3.0 to pH 5.0; said protease obtained from said *Bacillus subtilis* being a clear brown liquid having a pH of pH 5.0 to pH 6.0 and having a minimum proteolytic activity of 0.5 AU/gm; said enzyme being present in an amount from about 0.001% to about 1% by weight per weight of the anhydrous form of said casein;

heating said casein and said enzyme to a temperature sufficient to effect a heat kill of said enzymes; and then isolating the heated casein by removing said water to form a solid milk protein hydrolysate.

13. The process of claim 12 wherein:
said alkali compound is added in an amount sufficient to give an initial pH of at least pH 8.

14. The process of claim 13 wherein:
the reaction solution, after the addition of said enzyme and said alkali compound to said casein, is monitored with regard to the pH of said reaction solution and when said pH drops to a pH of at least about pH 7 said reaction solution is heated to heat kill said enzyme.

15. The process of claim 14 wherein:
said reaction solution is heated to a temperature greater than 160° F. to effect said heat kill of said enzyme.

16. The process of claim 15 wherein:
said reaction mixture is heated to a temperature of at least about 190° F. to effect said heat kill of said enzyme.

17. The process of claim 14 wherein:
said heat treatment to kill said enzyme is initiated between a pH of about pH 7 to a pH of about pH 6.7.

18. The process of claim 12 wherein:
said compound is chosen from the group consisting of sodium hydroxide and potassium hydroxide.

19. The process of claim 18 wherein:
said compound is potassium hydroxide.

* * * * *

UNITED STATES PATENT AND TRADEMARK OFFICE
CERTIFICATE OF CORRECTION

PATENT NO. :  4,600,588
DATED     :  July 15, 1986
INVENTOR(S) :  JOHN H. ERNSTER It is certified that error appears in the above-identified patent and that said Letters Patent is hereby corrected as shown below:

Column 2, line 53, "unobjectionable" should be --objectionable--.

Column 8, line 20, "is" should be --was--.

Column 9, line 4, "not" should be --no--.

Signed and Sealed this

Twenty-seventh Day of January, 1987

Attest:

DONALD J. QUIGG

Attesting Officer    Commissioner of Patents and Trademarks